United States Patent
Müller

[11] Patent Number: 6,031,574
[45] Date of Patent: Feb. 29, 2000

[54] DEVICE FOR STORING VIDEO DATA

[75] Inventor: Detlef Müller, Renningen, Germany

[73] Assignee: Alcatel N.V., Rijswijk, Netherlands

[21] Appl. No.: 08/697,643

[22] Filed: Aug. 29, 1996

[30] Foreign Application Priority Data

Aug. 29, 1995 [DE] Germany .......................... 195 31 847

[51] Int. Cl.⁷ .................. H04N 7/30; H04N 7/32
[52] U.S. Cl. .................. 348/410; 348/400; 386/111
[58] Field of Search .................. 348/410, 409, 348/400, 401, 411–412, 415, 6, 7, 12–14, 17–19; 386/27, 33, 109, 111; 382/232, 236, 244

[56] References Cited

U.S. PATENT DOCUMENTS

| | | | |
|---|---|---|---|
| 5,079,630 | 1/1992 | Golin et al. | 348/399 |
| 5,140,437 | 8/1992 | Yonemitsu et al. | 386/111 |
| 5,345,268 | 9/1994 | Matsuta et al. | 348/400 |
| 5,371,532 | 12/1994 | Gelman et al. | 347/7 |
| 5,371,602 | 12/1994 | Tsuboi et al. | 358/335 |
| 5,521,630 | 5/1996 | Chen et al. | 348/7 |
| 5,720,037 | 2/1998 | Biliris et al. | 348/7 |
| 5,867,625 | 2/1999 | McLaren | 386/68 |

FOREIGN PATENT DOCUMENTS

| | | | |
|---|---|---|---|
| 0627855 | 12/1994 | European Pat. Off. | H04N 5/92 |
| 0676898 | 10/1995 | European Pat. Off. | H04N 7/173 |
| 0683611 | 11/1995 | European Pat. Off. | H04N 5/926 |
| 0695088 | 1/1996 | European Pat. Off. | H04N 5/926 |
| 3613343 | 10/1987 | Germany | H04N 7/30 |
| 3831277 | 3/1990 | Germany | H04N 7/30 |
| 9613121 | 5/1996 | WIPO | H04N 5/76 |

OTHER PUBLICATIONS

"Audio– und Videodaten–kompression mit MPEG2", R. Grigat et al, *Funkschau* Mar. 1995, pp. 26–33.

*Primary Examiner*—Vu Le
*Attorney, Agent, or Firm*—Ware, Fressola, Van Der Sluys & Adolphson LLP

[57] ABSTRACT

To reduce the data in a video-server (SER), a compression of the video data of a video film is performed by coding according to the interframe method (K1). In addition, the video data of predetermined individual video pictures are coded according to the intraframe method (K2), and are stored (MEMO) as entry points parallel to the corresponding interframe-coded video data. When the video film is transmitted, only the interframe-coded video data are transmitted. In response to a request for fast forward or fast backward mode only, the video data of the entry point are transmitted intraframe-coded, and all subsequent video pictures are transmitted interframe-coded.

10 Claims, 3 Drawing Sheets

DEVICE FOR STORING VIDEO DATA

TECHNICAL FIELD

The invention concerns a device for storing video data, a method of storing video data, as well as a method of transmitting video data.

BACKGROUND OF THE INVENTION

In so-called video-on-demand systems, video data are coded in a video-server and stored, and are transmitted to a customer upon request via a broad-band cable distribution network. The picture information of the video data is divided into video pictures which produce a video film when they are placed together in sequence.

Due to the limited transmission capacity of broad-band cables, and above all the cables of the subscriber line network, a compression of the video data is performed by coding according to the interframe method, to reduce the data in the video-server. To that end only the difference in the video data of sequential video pictures are coded and stored, but not the video data of the original video pictures. When interframe-coded video data are transmitted, it is a disadvantage that they cannot be wound in a fast forward direction or in a fast backward direction because the picture information of the preceding video picture is always needed to create the present video picture.

From DE 38 31 277 it is known that intraframe-coded video data are inserted and stored from time to time in the interframe-coded video data stream. The intraframe-coding utilizes the video data correlation within one video picture. The bit rate of intraframe-coded video data is significantly higher than the bit rate of interframe-coded video data. A rapid forward or backward motion of the picture takes place through the separate reading and transmitting of the intraframe-coded video data inserted into the interframe-coded video data stream. A disadvantage of the method is that an increased transmission capacity is needed to transmit a video film.

DISCLOSURE OF INVENTION

It is therefore the task of the invention to make a device and a method available, whereby video data can be stored and transmitted at less cost.

According to a first aspect of the invention, a device (V) for storing video data where picture information is divided into video pictures, comprising a first encoder (K1) for coding video data according to an interframe method, with a second encoder (K2) for coding video data according to an intraframe method, and with a memory (MEMO), wherein the device (V) further comprises a control unit (CTRL) for controlling both encoders (K1, K2) for respectively reading interframe-coded video data and intraframe-coded video data of predetermined individual video pictures and for storing both said interframe-coded video data as well as said intraframe-coded video data of predetermined individual video pictures in the memory (MEMO).

According to a second aspect of the invention, a method for storing video data, where picture information is divided into video pictures, where the video data are coded according to an interframe method and stored as interframe-coded video data, characterized in that the video data of predetermined individual video pictures are additionally coded according to an intraframe method, irrespective of the interframe-coded video data, and are stored as entry points parallel to the corresponding interframe-coded video data.

According to a third aspect of the invention, a method for transmitting video data where picture information is divided into video pictures, whereby interframe-coded video data are transmitted sequentially, characterized in that in response to a request for fast forward or fast backward mode, at an entry point intraframe-coded video data of a video picture are transmitted first instead of the interframe-coded video data, and then subsequent interframe-coded video data.

A special advantage of the invention is that video-on-demand services with fast forward and fast backward mode are made possible via an integrated services digital network.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
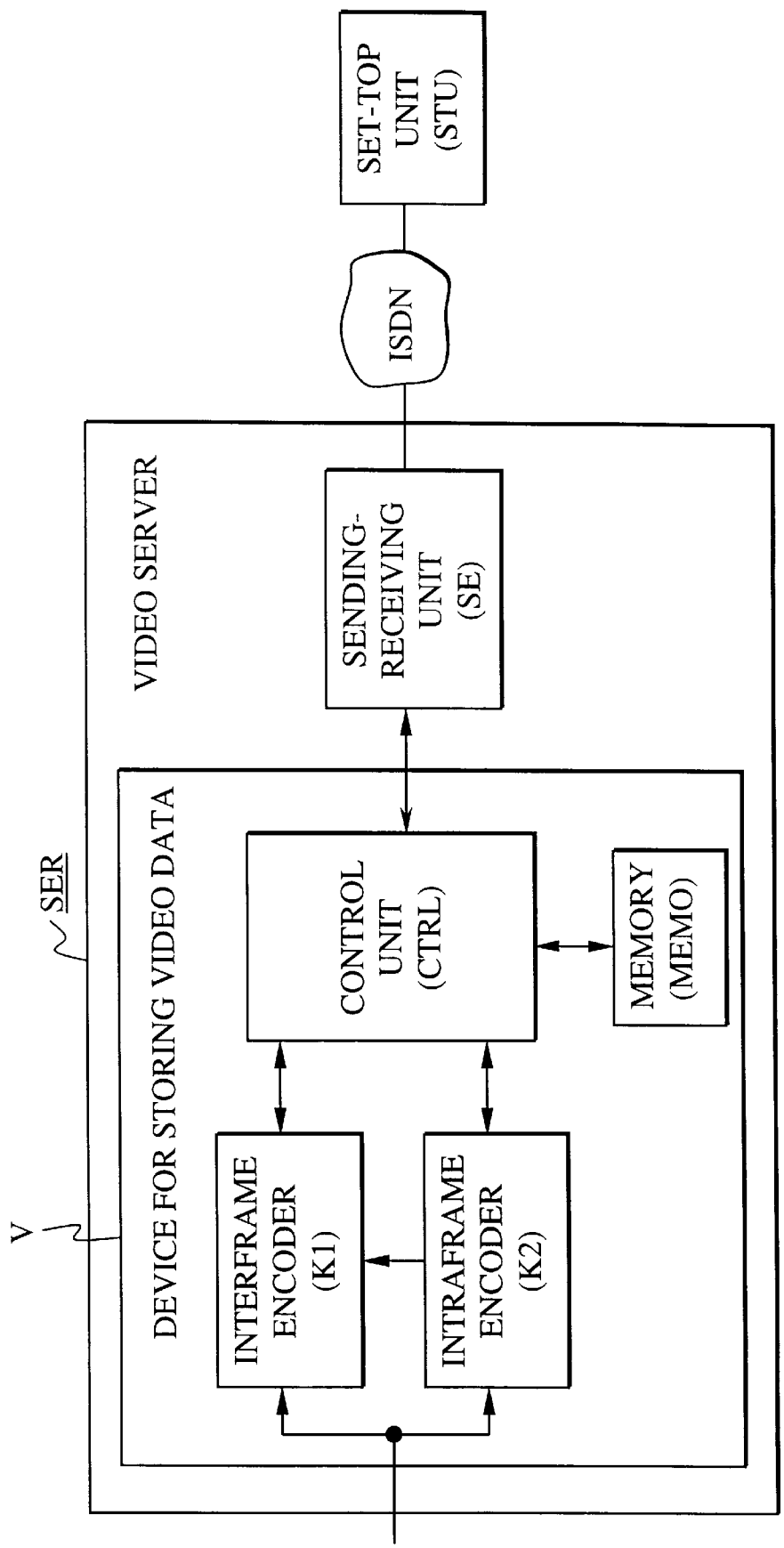
FIG. 1 is a schematic illustration of a first configuration example of a video-server according to the invention.

A first configuration example of the invention will now be described by means of FIG. 1. FIG. 1 illustrates a video-server according to the invention in conjunction with an integrated services digital network and a set-top box.

In the configuration example, the video-server SER is the server of a video-on-demand central in which video films, e.g. satellite transmitted telecasts are received, coded and stored in data banks, and from which at the request of customers special video films are transmitted in the form of video data to the set-top box STU of a customer via the integrated services digital network ISDN.

The received video data are decoded in the set-top box STU. The request for video films also takes place via the set-top box STU. The set-top box STU is e.g. connected to the customer's television set, which displays the received video data.

The video-server SER comprises a sending-receiving unit SE and a device V for storing video data with an encoder K1, an encoder K2, a control unit CTRL and a memory MEMO.

The control unit CTRL contains e.g. a microprocessor. It is connected to encoder K1, encoder K2, the memory MEMO and the sending-receiving unit SE whereby it can interchange bidirectional data, and which it controls.

The encoder K1 codes video data according to the interframe method. The interframe method utilizes the correlation between time-sequential video films. The encoder K1 is controlled by the control unit CTRL. It receives video data from satellite-transmitted telecasts e.g., codes them according to the interframe method and then transmits them to the control unit CTRL. A corresponding encoder is known e.g. from DE 36 13 343 A1.

The encoder K2 codes video data according to the intraframe method. The intraframe method utilizes the correlation of video data within one video picture. A corresponding encoder is known e.g. from DE 36 13 343 A1. The bit rate compression that must be achieved is smaller with the intraframe-method than with the interframe-method. The encoder K2 is controlled by the control unit CTRL. It receives the same video data as the encoder K1. Under the control of control unit CTRL, the encoder K2 codes video data of predetermined individual video pictures and transmits them to the control unit CTRL. One of said predetermined video pictures is the starting video picture of the received video film, which is additionally transmitted to encoder K1 so that the latter can start the interframe method.

The memory MEMO is a fully addressable memory, e.g. a magnetic disk, a magnetic tape, a compact-disk-read-only-memory, a so-called CD-ROM, or the hard disk of a data bank.

The sending-receiving unit SE contains a protocol preparation unit in which the protocol of the integrated services digital network ISDN is adapted to the protocol of control unit CTRL, and vice versa. It furthermore contains an amplifier for amplifying the signals of control unit CTRL and possibly an encoding unit for coding the video films.

The ISDN is the so-called integrated services digital network. In the basic access configuration, two B-channels with 64 kbit/s and a D-channel with 16 kbit/s are available to a customer. One or both B-channels are used to receive the video data transmitted by the video-server SER, the D-channel and/or one B-channel is used to request video films in the video-server and to request the fast forward or fast backward mode.

The following describes a process of storing a video film, according to the invention. If the device V, e.g., receives a video film with uncompressed video data with a corresponding receiver via a not illustrated satellite antenna, or via a not illustrated video recorder, the starting video picture may first be intraframe-coded in the encoder K2 and subsequently transmitted to the encoder K1 and to the control unit CTRL. The control unit CTRL can then select a free storage area in the memory MEMO and write the intraframe-coded video data of the starting video picture to the starting address of the selected storage area. In addition the control unit CTRL can assign a Go-To address which may also be stored. In that case, the Go-To address indicates at what address video data of the following video picture is located. This is, e.g., the reading address with the value of the starting address increased by one. The video data of all the video pictures that follow the starting video picture may then be interframe-coded in the encoder K1 and stored with a reading address and a Go-To address in the memory MEMO.

Video data from predetermined individual video pictures, e.g. each twentieth video picture or all video pictures in which a change of scenery takes place, are additionally intraframe-coded in encoder K2 under the control of control unit CTRL, irrespective of the interframe-coding. The intraframe-coded video data are stored in the memory MEMO parallel to the corresponding interframe-coded video data. The intraframe-coded video data and the interframe-coded video data of the predetermined individual video pictures receive different reading addresses and the same Go-To addresses, so that the intraframe-coded video data can be used as entry points for the fast forward and fast backward mode.

The process of transmitting a video film is described in the following. The customer requests a video film from the video-server SER via the D-channel and/or a B-channel. Under the control of control unit CTRL, the requested video film is retrieved from the memory MEMO and transmitted to the customer via one or both B-channels, by reading and transmitting the video data of the starting video picture, beginning with the starting address, and then sequentially transmitting all the subsequent video data whose sequence is provided by the Go-To addresses and the subsequent reading addresses stored therein. The transmission stops when the final address has been reached.

If the customer now requests a fast forward or fast backward mode via the D-channel and/or a B-channel during the transmission of the video film, the transmission of the video film continues at an entry point under the control of control unit CTRL, after the next fully transmitted video picture. The selection of the entry point takes place through an address list in which all reading addresses of the intraframe-coded video data are stored. Starting from the present status of the intraframe-coded video data reading address, the entry point address of the intraframe-coded video data is selected by a counter in accordance with the requested advancing value. After the transmission of the entry point video data, the subsequent interframe-coded video data are transmitted, starting with the reading address stored in the Go-To address of the entry point.

The same applies for the request of a fast backward mode. The customer's set-top box STU is, e.g., connected to a video telephone. Video conferences and video-on-demand can then take place e.g. via the video telephone. To request a video film, the customer dials the telephone number of a video-server thereby establishing a switched connection. He then selects a video film from the menu displayed on the video telephone screen by entering a selection number on the keyboard of the video telephone. The set-top box STU can also be integrated into the video telephone.

A second configuration example will now be described by means of FIG. 2, which illustrates a device for storing video data according to the invention.

The device V comprises an encoder K1, an encoder K2, a control unit CTRL, a memory MEMO and a decoder DEC. The device V corresponds to the structure and the connection of the elements of device V in FIG. 1, with the following exception: The device V has an additional decoder DEC, which is controlled by the control unit CTRL and its output is connected to encoder K2.

The decoder DEC decodes interframe-coded video data. Such a decoder can also be located, e.g., in a set-top box.

The device V is located, e.g., in a television institution or a service provider. Uncompressed video data of current telecasts or uncompressed video films are interframe- and intraframe-coded in the device, and stored on magnetic tape or on CD-ROMs as described for FIG. 1. The CD-ROMs can then be sold to a video-server or directly to the customers.

The coding and storing of the video data takes place as described for FIG. 1, with the following exception: The video data of the predetermined video pictures to be intraframe-coded are not produced from the received video data but from the corresponding interframe-coded video data which are sent to the decoder DEC, by decoding them and subsequently sending them to the encoder K2. The detour via the decoder DEC produces the advantage that faults created in the encoder K1 during interframe-coding are taken into consideration, for better tuning of the intraframe-coded video data to the interframe-coded video data, thus easing the two-way adaptation at the entry points.

Figure 2:
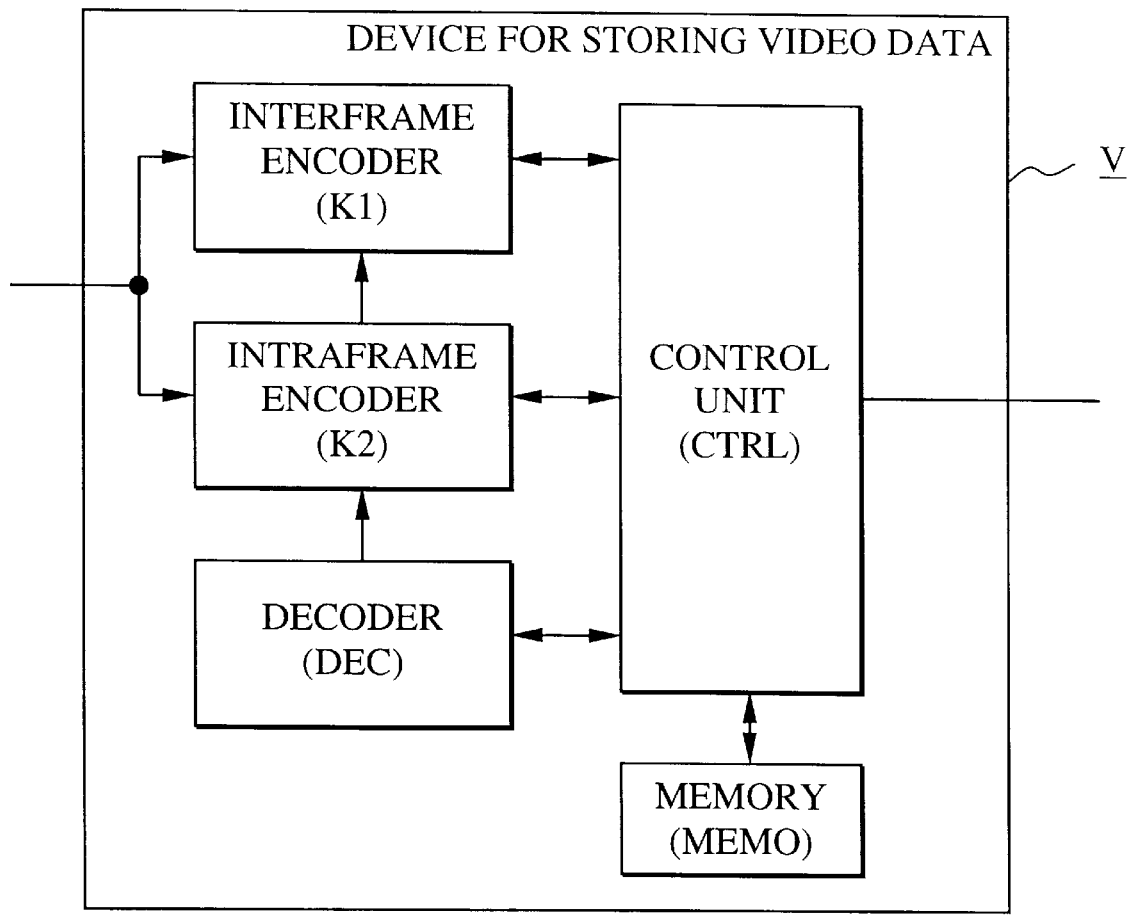
FIG. 2 is a schematic illustration of a second configuration example of a device for storing video data according to the invention.
Figure 3:
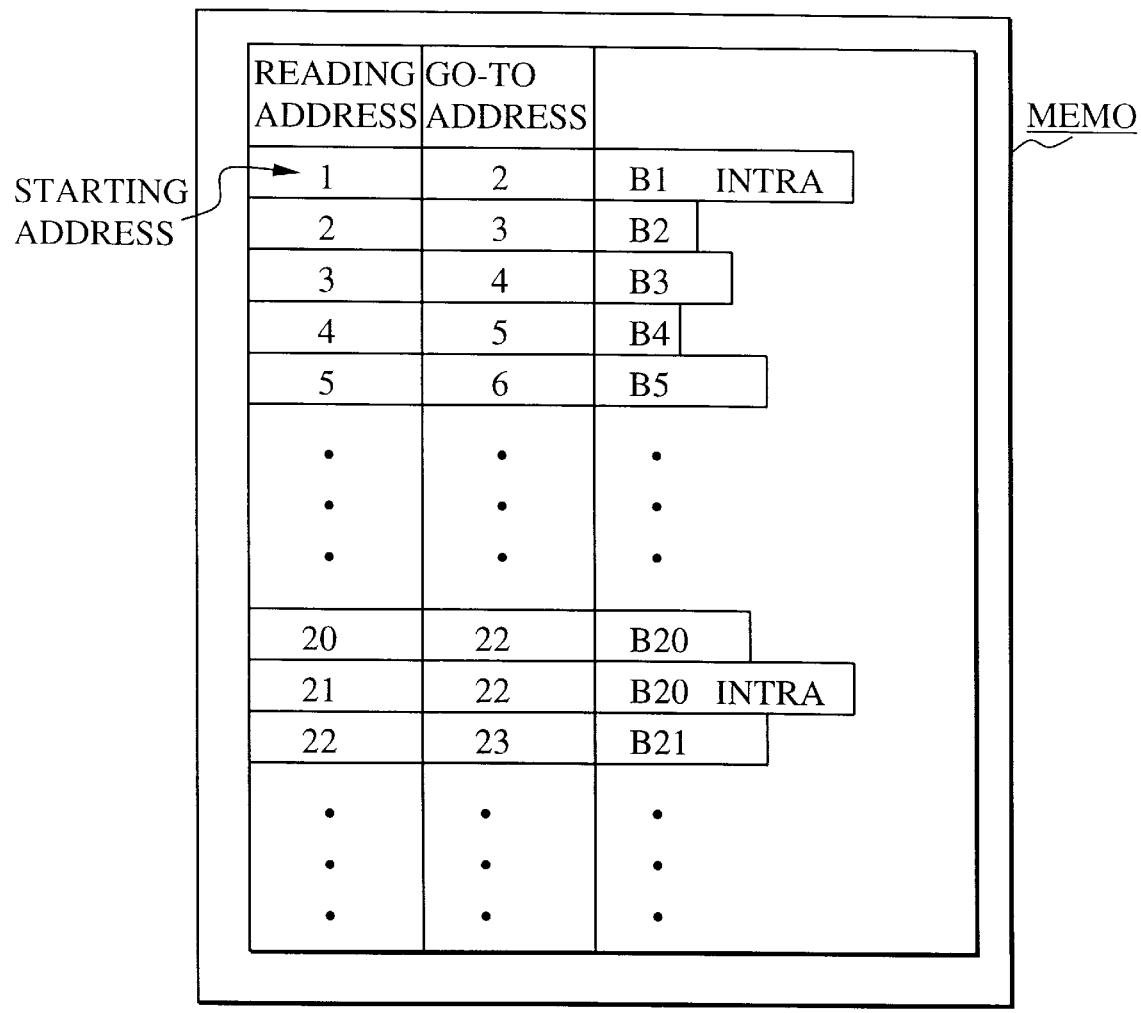
FIG. 3 is a schematic illustration of the structure of a memory in the device according to the invention.

FIG. 3 illustrates a memory which can be used in both the video-server described for FIG. 1 and in the device described for FIG. 2. The memory MEMO can be a fully addressable memory. A video film can, for example, be stored in an area of memory MEMO in the following manner: The Go-To address 2 and the intra(frame)-coded video data of the starting video picture are stored at the starting address 1. The Go-To address 3 and the interframe-coded video data of the second video picture, namely the one following the starting video picture, are stored at the reading address 2. The Go-To address 4 and the interframe-coded video data of the third video picture are stored at the reading address 3. If additional interframe-coded video data need to be produced and stored for all twenty video pictures, it takes place as follows: The Go-To address 22 and the interframe-coded video data of the twentieth video picture are stored at the reading address 20. The Go-To address 22 and the intraframe-coded video data of the twentieth video picture are stored at the reading address 21. The Go-To address 23 and the interframe-coded video data of the twenty-first video picture are stored at the reading address 22.

In both configuration examples the starting video picture of a video film is intraframe-coded. Instead of the intraframe-coding, an interframe-coding with e.g. an all white, an all black or a studio picture can be used as the reference picture. The uncoupling of both encoders can be achieved in this manner. This is especially advantageous for the second configuration example, because it permits performance of the interframe-coding first, and the intraframe-coding of the predetermined individual video pictures in a second e.g. locally and/or timely separated step. The intraframe-coded video pictures are then stored with the corresponding Go-To addresses in a special address area. Another possibility of uncoupling the two encoders consists in equipping the interframe-encoder in a way so that it is able to intraframe-code as well.

The integrated services digital network ISDN is used to transmit the video films in the first configuration example. The broad-band ISDN, a radio network or a cable television distribution network can also be used e.g. instead of the ISDN. In the cable television distribution network, which is constructed of optical glass fibers, hybrid or coaxial lines, the video films are transmitted e.g. by a server to television sets or to computers.

The video films in the first configuration example are exclusively transmitted interframe-coded, if there is no request for a fast forward or a fast backward mode. To increase the noise immunity, intraframe-coded video data can be inserted into the sequential video data streams at widely spaced regular intervals, e.g. every 100 pictures.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A device (V) for encoding and storing video data wherein received picture information is divided into video frames and encoded before said storing, comprising
   a first encoder (K1) for coding said received picture information divided into video frames according to an interframe coding,
   a second encoder (K2) for coding said received picture information according to an intraframe coding,
   a memory (MEMO), and
   a control unit (CTRL) for controlling both encoders (K1, K2)
   for intraframe coding a first frame of said video frames, and thereafter
   for interframe coding every frame of said video frames of said received picture information,
   for intraframe coding only predetermined individual frames of said received picture information,
   for storing said every interframe-coded frame as well as said intraframe-coded predetermined individual frames in the memory (MEMO),
   for reading and transmitting an intraframe-coded video data frame followed by a sequence of interframe-coded video data frames for transmission without interruption by intraframe-coded video data frames until a fast forward or fast backward command is received, and
   for reading and transmitting one intraframe-coded video data frame of said predetermined individual frames followed by a sequence of interframe coded frames upon receipt of said fast forward or fast backward command.

2. A device (V) as claimed in claim 1, further comprising a decoder (DEC) for decoding interframe-coded frames of video data, and for providing interframe-coded frames of video data of the predetermined individual frames of video data to the second encoder (K2).

3. A device (V) as claimed in claim 1, wherein the control unit controls storing a particular frame of picture information in an interframe-coded video frame and an intraframe-coded video frame of said particular frame in the memory (MEMO) with different reading addresses and with the same Go-To address.

4. A device (V) as claimed in claim 1, for use in a video-server (SER).

5. A method for storing video data, wherein picture information is divided into a sequence of video frames, wherein, a first frame of said sequence is coded according to an intraframe coding method and stored as intraframe-coded video data and every subsequent frame is coded according to an interframe method and stored as interframe-coded video data, and wherein predetermined individual video frames of said sequence of video frames are separately coded according to an intraframe method, resulting in an intraframe-coded video frame and a corresponding but separate interframe-coded video frame, and wherein said predetermined frames that are intraframe-coded are stored as entry points parallel to the corresponding interframe-coded video data.

6. A method for transmitting video data wherein picture information is divided into video frames, wherein, a first frame of said sequence is coded according to an intraframe coding method and all subsequent video frames are interframe-coded and wherein predetermined frames of said subsequent video frames are intraframe-coded as well, resulting in said predetermined frames being both an intraframe-coded video frame and a corresponding interframe-coded video frame, wherein said interframe-coded video frames are transmitted sequentially, and wherein the transmitting of intraframe-coded video frames at closely-spaced regular intervals is avoided except in response to a request for fast forward or fast backward mode, wherein at an entry point intraframe-coded video data of one video frame are transmitted first instead of the interframe-coded video data, and then subsequently interframe-coded video frames.

7. A method as claimed in claim 6, wherein said transmitting of intraframe-coded video frames at regular intervals is not entirely avoided but rather wherein intraframe-coded video frames are inserted at widely-spaced, regular intervals into the sequential video data stream.

8. A method as claimed in claim 6, wherein the video frames are transmitted to a video telephone via an integrated services digital network (ISDN).

9. Method, comprising the steps of:

receiving a sequence of video frames for compression;

encoding a first frame of said sequence of video frames for compression according to an intraframe-encoding method and all subsequent frames according to an interframe-encoding method;

separately encoding predetermined frames of said subsequent frames according to said intraframe-encoding method; and storing said first frame encoded according to said intraframe encoding method, said all subsequent frames encoded according to said interframe-encoding method, and said predetermined frames of said subsequent frames encoded according to said intraframe-encoding method for retrieval in a sequence of compressed comprising first said first frame followed by said all subsequent frames encoded according to said interframe-encoding method interrupted by one of said separately encoded predetermined frames in response to a user request for fast-forward or rewind.

10. Apparatus, comprising:

means for receiving a sequence of video frames for compression;

means for encoding a first frame of said sequence of video frames for compression according to an intraframe-encoding method and all subsequent frames according to an interframe-encoding method;

means for separately encoding predetermined frames of said subsequent frames according to said intraframe-encoding method; and means for storing said first frame encoded according to said intraframe encoding method, said all subsequent frames encoded according to said interframe-encoding method, and said predetermined frames of said subsequent frames encoded according to said intraframe-encoding method for retrieval in a sequence of compressed comprising first said first frame followed by said all subsequent frames encoded according to said interframe-encoding method interrupted by one of said separately encoded predetermined frames in response to a user request for fast-forward or rewind.

* * * * *

UNITED STATES PATENT AND TRADEMARK OFFICE
CERTIFICATE OF CORRECTION

PATENT NO.    : 6,031,574                                              Page 1 of 1
DATED         : February 29, 2000
INVENTOR(S)   : D. Müller It is certified that error appears in the above-identified patent and that said Letters Patent is hereby corrected as shown below:

Column 7,
Line 18, prior to "comprising", please insert -- frames --.

Column 8,
Line 16, prior to "comprising", please insert -- frames --.

Signed and Sealed this

Eighth Day of January, 2002

Attest:

JAMES E. ROGAN
Attesting Officer      Director of the United States Patent and Trademark Office